United States Patent
Komori et al.

[15] 3,637,303
[45] Jan. 25, 1972

[54] ELECTROPHOTOGRAPHIC COPYING MACHINE HAVING MOVABLE SLIT-EXPOSURE STATION

[72] Inventors: Shigehiro Komori, Yokohama-shi, Kanagawa-ken; Jiro Sato, Kawasaki-shi, Kanagawa-ken, both of Japan

[73] Assignee: Canon Kabushiki Kaisha, Tokyo, Japan

[22] Filed: June 17, 1969

[21] Appl. No.: 834,095

[30] Foreign Application Priority Data

June 21, 1968  Japan........................43/43319
Aug. 22, 1968  Japan........................43/60163

[52] U.S. Cl. ..................355/8, 355/65, 355/66, 355/18, 355/70
[51] Int. Cl. ..................G03g 15/04
[58] Field of Search..................355/8, 18, 65, 51, 70, 73, 355/52, 66

[56] References Cited

UNITED STATES PATENTS 3,451,752  6/1969  Frank ........................355/8

Primary Examiner—Samuel S. Matthews
Assistant Examiner—E. M. Bero
Attorney—Watson, Leavenworth and Kelton

[57] ABSTRACT

In a copying machine of the stationary original slit exposure type, a housing is provided with an original holder and a carriage which reciprocates with respect to the original holder. The carriage incorporates a slit exposure means and an optical system which directs a light image from the original to the slit exposure means. A photosensitive member is advanced during movement of the carriage and progressively slit exposed to the original light image and then developed successively.

13 Claims, 23 Drawing Figures

3,637,303

ELECTROPHOTOGRAPHIC COPYING MACHINE HAVING MOVABLE SLIT-EXPOSURE STATION

The present invention relates to an electrophotographic copying machine and more particularly to an electrophotographic copying machine of the type in which an original is held stationary and the exposure is made through a slit. The electrophotographic copying machines may be generally classified into two types. One type is such that the original is held in stationary position while the other type is such that the original is moved. The former has advantages as follows:

a. the copying may be safeguarded because the original holder is held stationary;
b. the stationary original holder will not permit any deviation of the original placed thereupon;
c. means for pressing the original against the original holder may be dispensed with because the original may be pressed upon the stationary holder manually so that it may not come off the surface of the holder; and
d. the increased speed of operation of the machine does not cause displacement or deviation of the original from its correct position, and thus the speed of operation of the machine is not limited by the original.

The former type may be further classified into two systems depending upon the exposure system. One type is a "stationary exposure" system while the other type is "slit exposure" system. The advantage and disadvantage of these systems are as follows.

In the "stationary exposure" system, flatness of the whole surface of the photosensitive member must be maintained with sufficient precision when exposed.

In the "slit exposure" system, the photocopying machine may be simple in construction and compact in size with the improved high-speed operation.

From the foregoing it will be readily seen that the "stationary-original slit exposure" type electrophotographic system is the most advantageous. However, this system has defects in that the mechanism is intricate and tends to bring about out-of-focus exposure because the angles of inclination of lenses and mirrors and/or the relative velocity therebetween must be varied while the optical system including such optical elements is moved when exposed.

The primary object of the present invention is therefore to provide an improved stationary-original slit exposure-type electrophotographic copying machine eliminating such defects as described above and encountered in the conventional copying machine of the type described.

Another object of the present invention is to provide an improved and new electrophotographic copying machine compact in size, easy to operate and highly reliable and dependable.

A further object of the present invention is to provide an improved and new electrophotographic copying machine which permits the making of copies at high speed having sharply focused images all over the surfaces thereof.

The present invention is characterized in that upon a carriage are disposed in unitary construction the illumination system and the exposure system or head. The carriage is reciprocated relative to the original held in stationary position through a suitable drive system and, in one of the carriage strokes, a photosensitive member previously imparted with the electrostatic charge is made to pass through the exposure head so as to be slit exposed.

The above and other objects, features and advantages of the present invention will become more apparent from the following description of illustrative embodiments taken in conjunction with the accompanying drawings.

Figure 20:
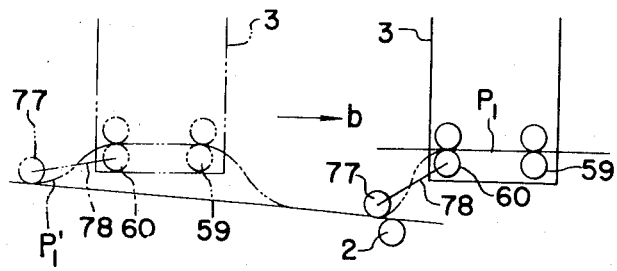
Figure 21:
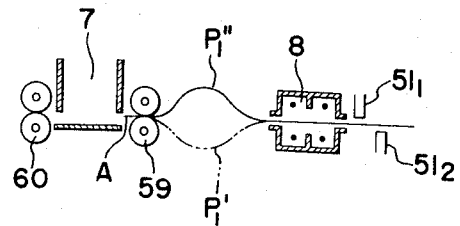
Figure 22:
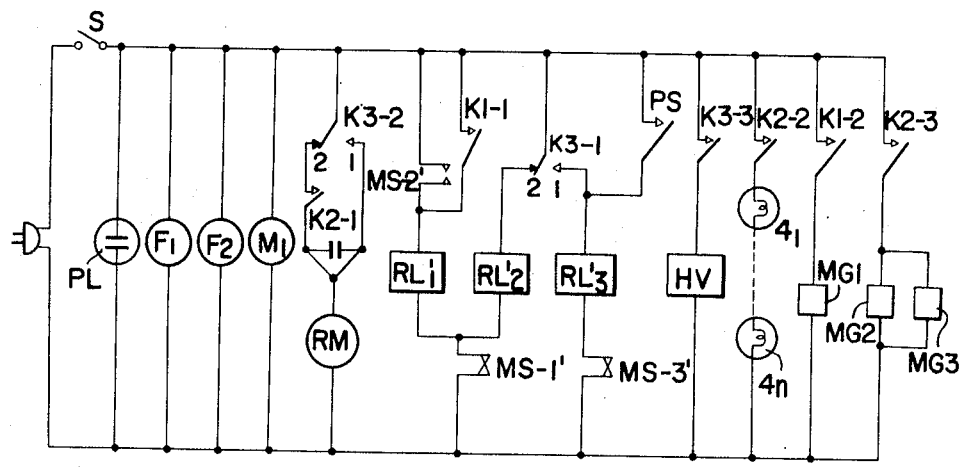

FIG. 20 representative of the operation of the carriage thereof;

FIG. 21 is representative of the photosensitive sheet feed or transportation;

FIG. 22 is an electric circuit diagram thereof; and

Figure 23:
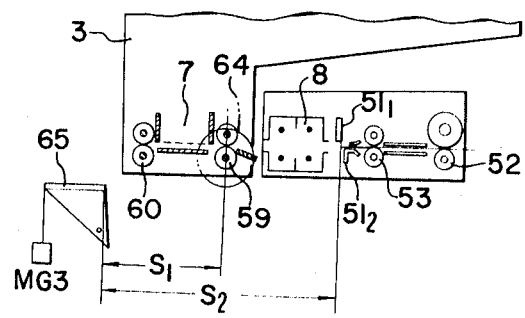

FIG. 23 is an explanatory view illustrating the relation between the velocity of the carriage and the photosensitive member transportation velocity.

Figure 15:
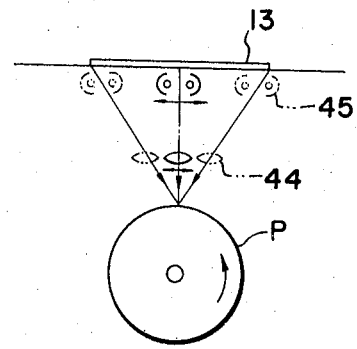
FIGS. 15 and 16 are diagrammatic views illustrating the conventional exposure systems.
Figure 16:
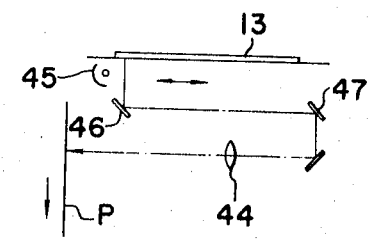

As shown in FIGS. 15 and 16, in the conventional "slit exposure" optical systems, the angles of inclination of a lens 44 and a reflecting mirror 45 or the relative velocity between the reflecting mirrors 46 and 47 must be varied when the whole exposure system is moved as a photosensitive member P is exposed by light from an original 13. Such exposure systems require more complicated mechanism and out-of-focus copies tend to be made.

Figure 1:
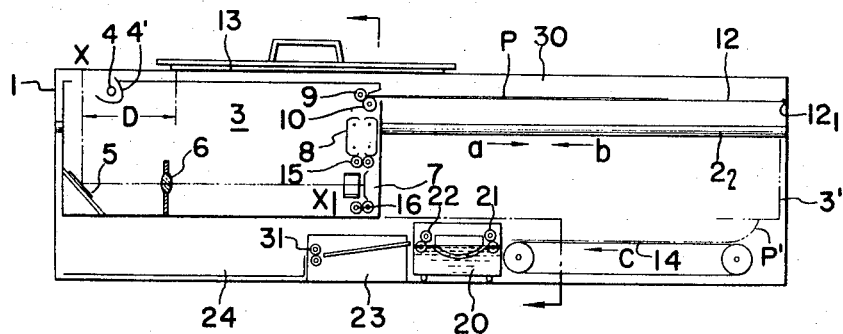
FIG. 1 is a longitudinal sectional view of a fundamental embodiment of an electrophotographic copying machine according to the present invention.
Figure 2:
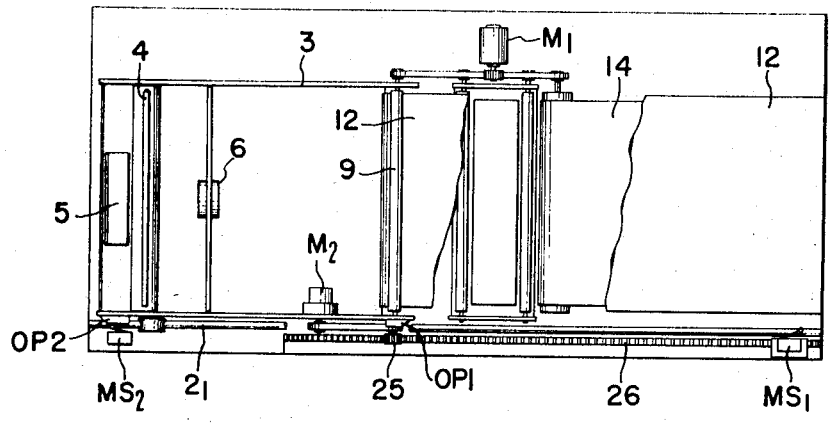
FIG. 2 is a plan view of the embodiment shown in FIG. 1.
Figure 3:
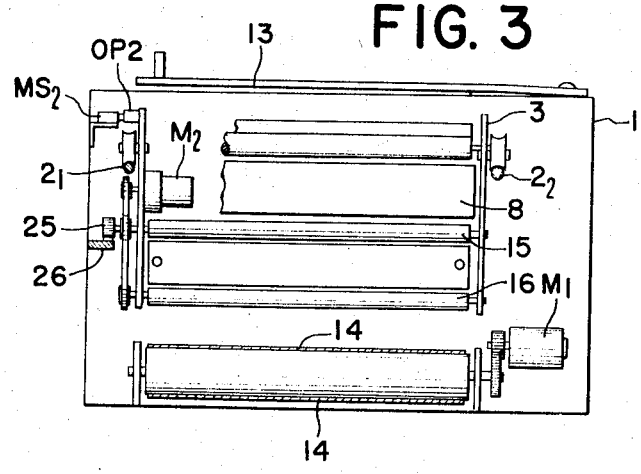
FIG. 3 is a transverse sectional view of the embodiment shown in FIG. 1.
Figure 4:
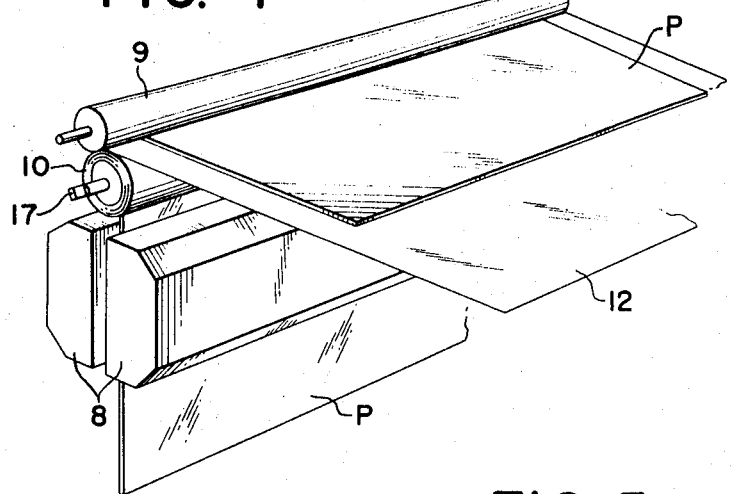
FIG. 4 is a fragmentary perspective view thereof illustrating the relation between a moving section or carriage and a photosensitive member advancing mechanism.
Figure 5:
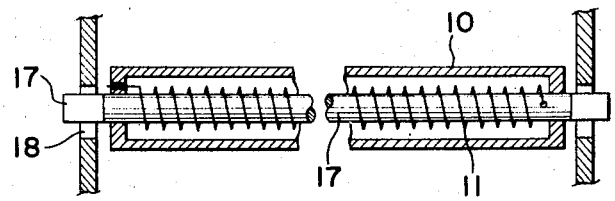
FIG. 5 is a longitudinal sectional view of a photosensitive member feed and conveying belt winding or taking up drum.

Referring to FIGS. 1, 2 and 3, within a machine frame 1 having a relatively short height are longitudinally fixed a pair of rails $2_1$ and $2_2$ upon which rides a carriage 3 having an optical system comprising an original illumination lamp 4 having a reflector 4', a reflecting mirror 5 and a lens 6, and an exposure system 7. In FIG. 1 a discharger 8 is disposed immediately before the exposure system or head 7 upon the carriage 3. As best shown in FIG. 4, a pair of photosensitive member guide rollers 9 and 10 are disposed immediately before the discharger 8, and the roller 10 has a winding spring 11 disposed therein as shown in FIG. 5. That is, the spring 11 serves to impart rotational force to a belt 12 for winding and rewinding. One side edge of the belt 12 is fixedly secured to the roller 10 while the other edge $12_1$ is secured to the inner wall surface of the machine frame 1 in such a manner that the belt 12 may be extended horizontally for supporting thereupon a photosensitive member P.

Figure 6:
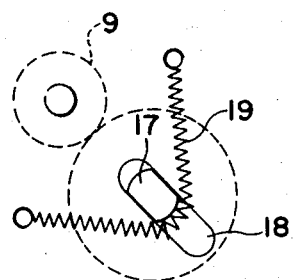
FIG. 6 is a diagrammatic view of a movable bearing member thereof.

When the carriage 3 is moved in the direction indicated by the arrow $a$ by a carriage drive motor $M_2$ (See FIG. 2), the roller 10 is caused to rotate in the counterclockwise direction by the spring 11 thereby winding the belt 12 carrying thereupon the photosensitive member P so that the photosensitive member P is moved into the discharger 8 where the photosensitive member P is uniformly imparted with the electrostatic charge. Thereafter, the photosensitive member P is further moved downwardly at a right angle relative to the optical axis $X-X_1$. In this case, the carriage 3 is displaced by a distance of D (See FIG. 1) and the light image incident slit X starts to scan an original placed in stationary position upon the machine frame 1. Since the velocity of the carriage 3 is synchronized with that of the photosensitive member P, the original image is sequentially slit exposed upon the photosensitive member P as it moves vertically downwardly. When the carriage 3 reaches the end 3' of the exposure stroke, the scanning of the original 13 and the exposure are completed so that the photosensitive member P leaves from a pair of guide rollers 16, falls upon a belt 14 as indicated by the broken line P' in FIG. 1 and is directed into a developing unit 20 by the belt 14. In this case, an actuating element OP1 opens the microswitch MS1 so that a relay RL is actuated, thereby reversing the rotation of the drive motor $M_2$. Thus, the carriage 3 is reversed in the direction indicated by the arrow $b$ while the roller 10 unwinds the belt 12 and the spring 11 is charged. As shown in FIGS. 5 and 6, a stationary shaft 17 of the roller 10 is so arranged as to be displaced in an elongated slot 18 of the carriage 3 depending upon the variation of the diameter of the belt 12 wound around the roller 10 so that a substantially constant pressure is applied to the roller 9 by a spring 19. In the return stroke of the carriage 3, the illumination lamp 4 is turned off.

The photosensitive member P is directed toward the developing unit 20 by the belt 14 driven by a drive motor $M_1$ in the direction indicated by $c$. The developing unit 20 is disposed at the bottom of the machine frame 1. The photosensitive member P is guided by guide rollers 21 and 22 while it is developed in the developing unit 20 and discharged into a tray 24 by a pair of guide rollers 31 after passing through a drier 23 (in case of a wet-type developing) or a fixing device (in case of a dry-type developing). The apparatus is so arranged that the photosensitive member P will not be admitted into the developing unit 20 during the exposure stroke of the carriage 3. The end of the exposure stroke of the carriage 3 may be adjusted depending upon the size of the original, but the mechanism for this purpose is not shown in the figures for the purpose of clarity.

Figure 7:
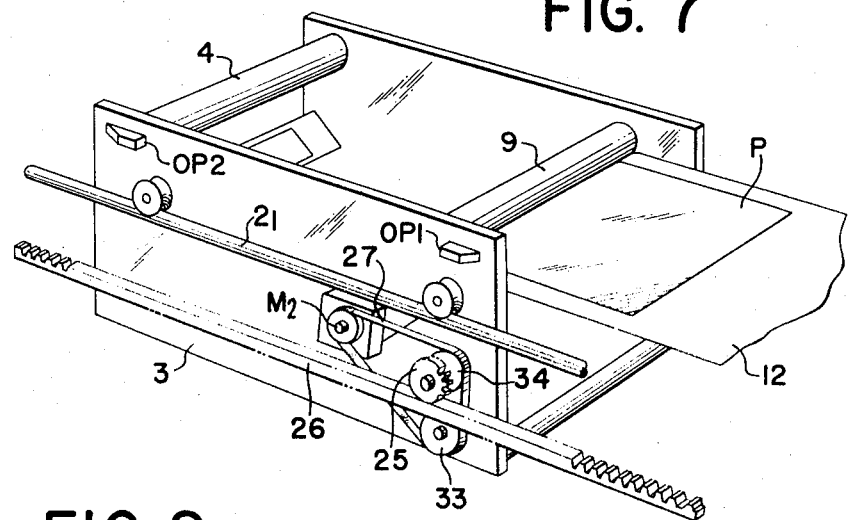
FIG. 7 is a perspective view of a drive mechanism of the carriage.

The carriage reciprocating mechanism is of conventional type. As shown in FIG. 7, a pinion 25 is rotated through a belt 27 from the shaft connected to the reversible motor $M_2$ mounted upon the carriage 3. Since the pinion 25 is in mesh with a rack rail 26 disposed in parallel with one guide rail $2_1$, the carriage 3 may be reciprocated. The motor $M_1$ normally drives the belt 14, the developing unit 20 and the drier 23.

Figure 8:
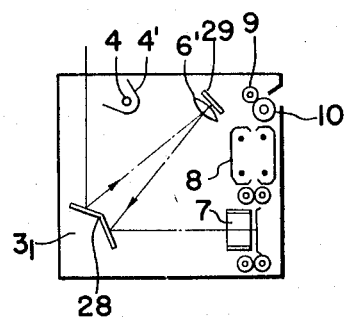
FIG. 8 is a longitudinal sectional view of another embodiment of the present invention in which the optical system of the first embodiment is modified so as to render the carriage compact in size.
Figure 9:
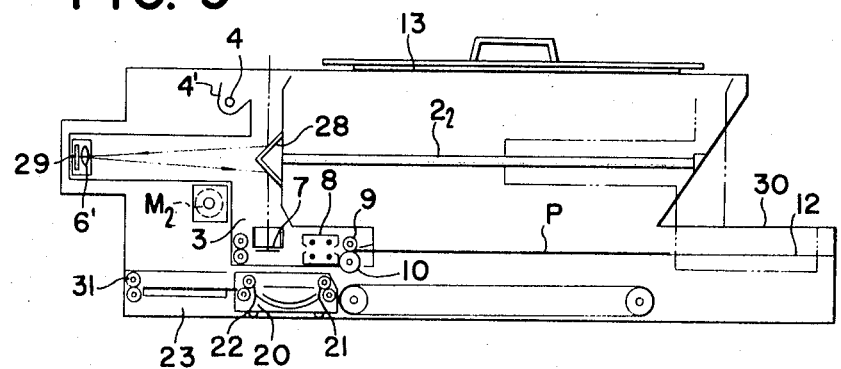
FIG. 9 is a longitudinal sectional view of a third embodiment of the present invention.

As best shown in FIG. 1, since the reflecting mirror 5 and the exposure head 7 are disposed along a common line, the length of the carriage 3 tends to be longer. To eliminate this defect, the present invention provides an improved construction as shown in FIG. 8. In this embodiment the illumination lamp 4 having the reflector 4' illuminates the original and the light reflected from the original is transmitted through the optical system consisting of a reflecting mirror 28, a lens 6' and a reflecting mirror 29, thereby focusing the image upon the photosensitive member P. In this construction, the length of the carriage 3 may be reduced approximately one-half as compared with that shown in FIG. 1 so that the whole construction of the copying machine itself may be made compact in size. The embodiment shown in FIG. 9 is for reducing the dimensions of the carriage 3 as in the case of that shown in FIG. 8 and for displacing the photosensitive member P horizontally opposed to the embodiments shown in FIGS. 1 and 8 wherein the photosensitive member is moved vertically. For this purpose, the discharger 8 is horizontally attached to the lower portion of the carriage 3, the photosensitive member conveyor belt 12 is disposed in the lower portion of the machine frame 1 so as to transport the photosensitive member P horizontally, and the exposure unit 7 is disposed in opposed relation with the horizontally moving photosensitive member P.

Figure 10:
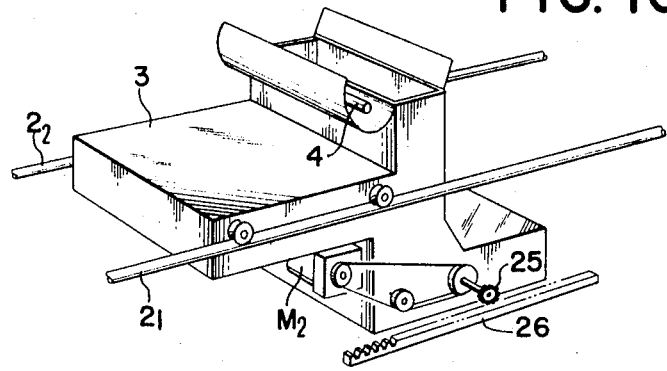
FIG. 10 is a perspective view of the carriage shown in FIG. 9.

FIG. 10 shows a perspective view of the carriage of this embodiment which is driven by the shaft connected to the drive motor $M_2$. The photosensitive member P may be inserted into the machine through an inlet 30 until the leading edge of the photosensitive member P reaches the pair of guide rollers 9 and 10.

Figure 11:
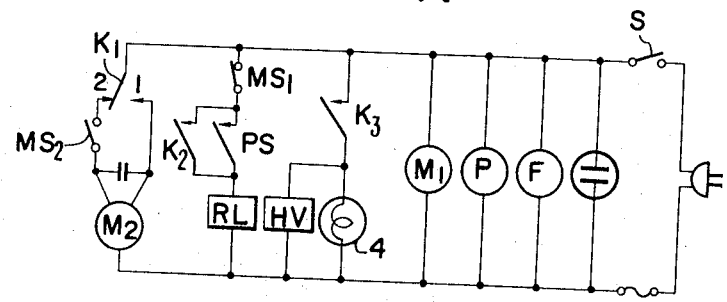
FIG. 11 is an electric circuit diagram for the embodiment shown in FIGS. 1, 8 and 9.

FIG. 11 shows an electrical circuit for the embodiments described with reference to FIGS. 1, 8 and 9. Upon closing a main switch S, the motor $M_1$ for driving the developing belt 14 and the guide rollers 21, 22 and 31 in the developing unit 20 and the drier 23 are energized. Next upon depression of a pushbutton PS, the relay RL is actuated so that contact is closed, thereby energizing the reversible motor $M_2$. Thus, the carriage 3 is moved in the direction indicated by $a$ so as to clamp the photosensitive member P and to move the same for charging and exposure. In this case, the contact $K_2$ of the relay is closed so as to self-lock the pushbutton PS, and the contact $K_3$ is closed so as to energize the illumination lamp 4 and to close the circuit of the high voltage source HV for the discharger.

The reversible motor $M_2$ drives the rubber feed rollers 15 and 16 through a chain or belt 27 and sprockets 33 and 34 and drives simultaneously the carriage 3 through the pinion 25 and the rack rail 26. When the carriage 3 completely moves the photosensitive member P through the exposure unit 7, that is, when the carriage 3 reaches the end of its exposure stroke, the microswitch $MS_1$ is opened, the relay RL is deenergized and the contact $K_1$-2 is closed thereby reversing the motor $M_2$ so as to return the carriage 3 to its normal or initial position. In this case, the contact $K_3$ is opened so that the lamp 4 and the high voltage source $HV_j$ are deenergized. When the carriage 3 returns its initial position, the microswitch $MS_2$ is opened so that the carriage 3 may be held stationary.

When the photosensitive member P is discharged out of the carriage 3, it is placed upon the belt 14 as indicated by the broken line P' and is directed toward the developing unit 20 and the drier 23 and discharged into the tray 24.

Figure 12:
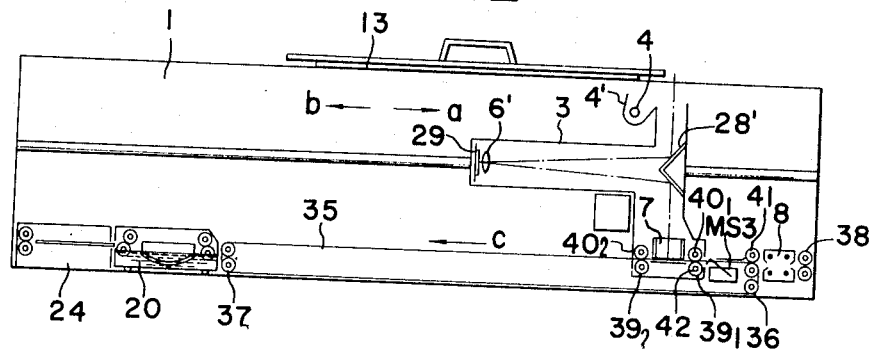
FIG. 12 is a longitudinal sectional view of an embodiment of the present invention in which means for imparting electrostatic charge to a photosensitive member is fixed to the housing.

FIG. 12 shows a still further embodiment of the present invention in which the high-voltage corona discharger 8 is fixed to the machine frame 1 instead of being mounted upon the carriage 3 in order to avoid complicated electrical wiring. The discharger 8 is fixed to the lower portion of the machine frame 1 and between the discharger 8 and the developing unit 20 is disposed a photosensitive member conveyor belt 35. On the opposite sides of the exposure unit 7 are disposed pairs of guide rollers $39_1$ and $39_2$ and $40_1$ respectively and a microswitch MS3 is attached to a position in the proximity of the inlet to the exposure unit 7 for detecting the passage of the photosensitive member.

Figure 14:
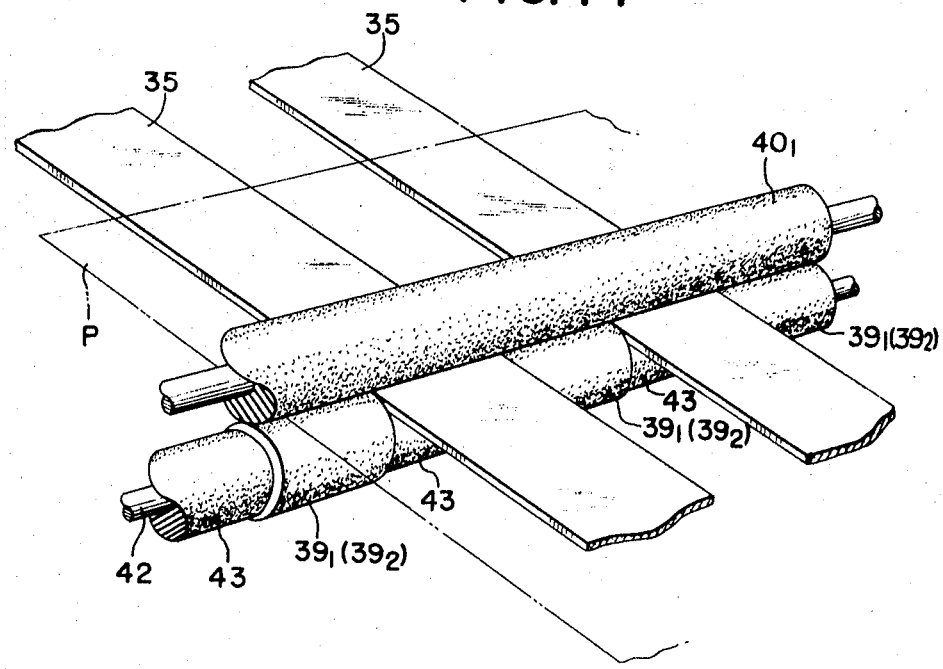
FIG. 14 is a perspective view illustrating the relation between the photosensitive member feed belts and their guide rollers in FIG. 12.

As best shown in FIG. 14, the rollers $39_1$ and $39_2$ are carried by a shaft 42 in spaced-apart relation with each other and between two adjacent rollers $39_1$ or $39_2$ are interposed belt guide rollers 43 having a diameter smaller than that of the roller $39_1$ or $39_2$. The belts 35 ride over the rollers 43 respectively so that the rollers $39_1$, $39_2$, $40_1$ and $40_2$ are rotated independently of the belts 35.

Figure 13:
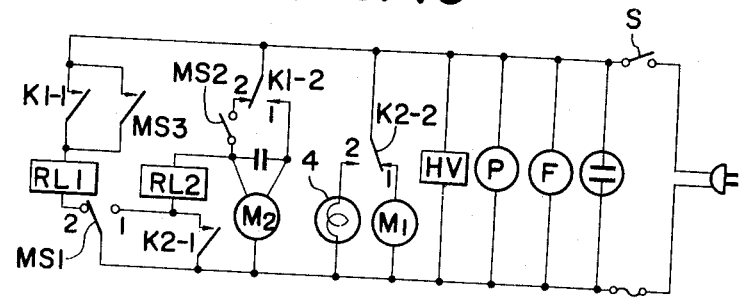
FIG. 13 is an electric circuit diagram for the embodiment shown in FIG. 12.

The mode of operation of this embodiment will be described hereinafter with reference to FIG. 13. Upon closing the main switch S, the drive motor $M_1$ and the fan for drying are rotated and the corona discharger 8 is energized from the high-voltage source HV. The rollers 36 and 37 are driven by the motor $M_1$ so that the conveyor belt 35 is moved in the direction indicated by the arrow $c$.

The photosensitive member P is transported through the guide rollers 38 and the corona discharger 8 and placed upon the belt 35 through the rollers 41 toward the exposure unit 7. In this case the microswitch MS3 is closed so that the relay $RL_1$ is energized and self-locked by the closed contact K1–1 while contact K1–2–1 1 is closed so that the carriage drive motor M2 is rotated.

The carriage 3 is moved by the motor M2 through a drive mechanism similar to that described hereinabove in the direction indicated by the arrow $b$ from its initial position in synchronism with the transportation of the photosensitive member. The microswitch MS2 which is fixed to the sidewall of the machine frame 1 and is opened by the carriage 3 when it is in its initial position, is closed upon carriage movement.

When the carriage 3 reaches a predetermined position, the actuating element (not shown) of the carriage 3 operates the microswitch MS1 to close the contact MS1-1. The microswitch MS1 is fixed to the sidewall of the machine frame 1. Thus, the relay RL1 is deenergized so that the contacts K1-1 and K1-2-1 are reversed and the relay RL2 is energized simultaneously. The relay RL2 is self-locked by its contact K2-1 and the contact K2-2-2 closes thereby turning on the lamp 4 so as to illuminate the original 13 and to deenergize the motor M1 so as to stop the belt 35 and to hold the photosensitive member stationary. When the contact 2 of the relay RL1 closes, the carriage drive motor M2 is reversed so that the carriage 3 is reversed in the direction indicated by $a$. Thus, the image of the original is exposed through a slit over the photosensitive member upon the belt 35 while the carriage 3 returns to its initial position. At the initial position, the microswitch MS2 is opened so that the motor M2 is stopped while the relay RL2 is deenergized simultaneously, thereby opening the contacts K2-1 and K2-2-2. Thus, the illumination lamp 4 is turned off and the motor M1 is rotated through now closed contact K2-2-1 so that the exposed photosensitive member is transported toward the developing unit 20. When the main switch S is opened, the operations of the copying machine are stopped.

Figures 17, 18:
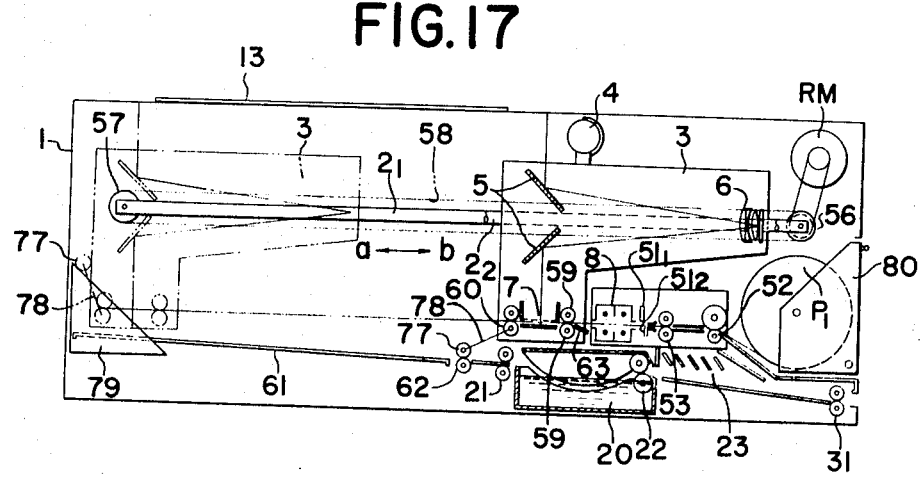
FIG. 17 is a longitudinal sectional view of another embodiment of the present invention.
FIG. 18 is a perspective view of a drive mechanism of the carriage thereof.

FIG. 17 shows a still another embodiment of the present invention of the type in which the high voltage corona discharger is attached to the machine frame 1 as in the case of the embodiment of FIG. 12. An original holder 13 is disposed at the upper and rear surface of the machine frame 1.

The carriage 3 is normally held in the stationary position indicated by the solid line in FIG. 17. Forwardly of its exposure unit 7 are disposed the corona discharger 8, a pair of photosensitive member cutters $51_1$ and $51_2$, pairs of feed rollers 52 and 53 and a rolled photosensitive member $P_1$, which is rotatably supported by brackets 80 made in unitary construction with the machine frame 1. However, it is to be understood that the present invention is not limited to the use of a rolled photosensitive member and that separate photosensitive members may be used. When the carriage 3 is stopped, the leading edge of the rolled photosensitive member is held in position immediately before the pair of cutters $51_1$ and $51_2$. Upon the movement of the carriage 3, the photosensitive member P' is transported by the feed rollers 52 and 53 through the corona discharger 8 toward the guide plate 63 fixed to the carriage 3. At the same time, the guide roller integral with the pinion 64 (See FIG. 18) in mesh with the rack plate 65 is rotated so that the leading edge of the photosensitive member P' upon the guide plate 63 may be advanced to the position indicated by $a$ in FIG. 21. When the pinion 64 moves out of mesh with the rack plate 65, the carriage 3 starts to move while the leading edge of the photosensitive member is held securely in the nip between the rollers 59. When the carriage 3 reaches the end of the going stroke indicated by the broken line in FIG. 17, the leading edge of the photosensitive member held between the pair of rollers 59 coincides with the trailing edge of the original $13_1$.

Figure 19:
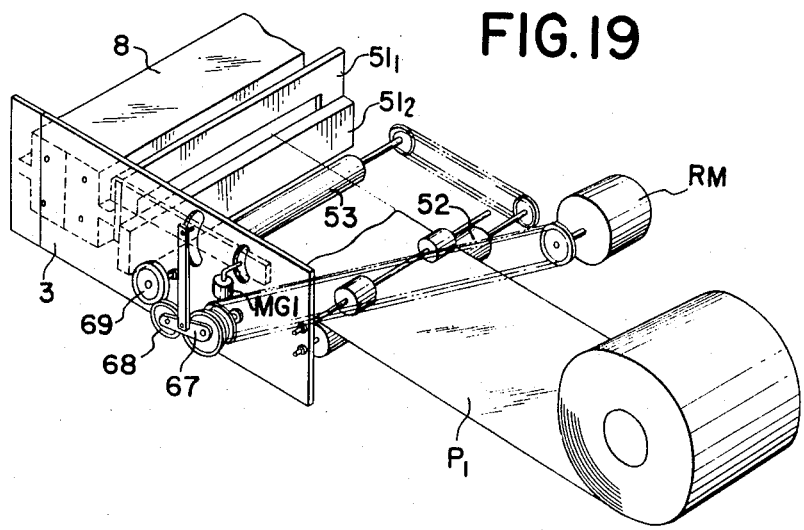
FIG. 19 is a perspective view of a photosensitive member feed mechanism thereof.

When the carriage 3 passes through a predetermined position, the actuating element 66 attached to the carriage 3 closes the microswitch MS-2' so that the plunger MG1 attached to the side surface of the machine frame 1 as shown in FIG. 19 is operated. Therefore, its arm 67 is caused to move downwardly so that a gear 68 is disengaged from a gear 69 (See FIG. 19) thereby stopping the feed rollers 52 and 53 so as to stop the feed of the member P and cutting off the stationarily held photosensitive member P by the pair of cutters $51_1$ and $51_2$ disposed immediately before the corona discharger 8.

In this case, assuming that the velocity of the carriage 3 be $V_1$, then, for the time $(t_1=S_1/V_1)$ required for the carriage 3 to move from its initial position to the position where the pinion 64 meshes with the rack plate 65, the photosensitive member P is transported together with the movement of the carriage 3 at a velocity of $V_2$ so that the photosensitive member P may be transported over a distance of $S_2$. When the relation of $(S_1/S_2)=(V_1/V_2)$ is held, the leading edge of the photosensitive member P is guided by the guide plate 63 and abuts against the rollers 59 upon engagement of the pinion 64 with the rack plate 65. Since $V_2>V_1$, the photosensitive member P is caused to slack as shown by P' or P'' in FIG. 21. It is preferable that the length of engagement between the pinion and the rack plate is so determined that the rollers 59 are rotated until the leading edge of the photosensitive member P reaches the position $a$ indicated in FIG. 21.

When the cutters $51_1$ and $51_2$ are operated, the slack of the photosensitive member has been increased sufficiently so that the photosensitive member P may be held stationarily when cut off. After cutoff, the carriage 3 is advanced while the leading edge of the photosensitive member is held securely in the nip between the rollers 59 and when the slack of the photosensitive member is reduced to zero, that is when the sheet is extended straight without any slack, the trailing edge of the photosensitive member P is released from the discharger. The rollers 59 are provided with mechanisms for permitting only unidirectional rotation thereof. That is, a mechanism such as a one-way clutch is provided so that rotation in the counterclockwise direction in FIG. 17 of the lower roller 59 may be permitted but clockwise rotation thereof is prevented, and vice versa for the upper roller 59. Therefore, rotation of the rollers 59 and 60 is prevented when the photosensitive member P is pulled by the rollers 59 as the slack in the photosensitive member is reduced.

The cutters may be operated not only by the electromagnetic mechanism but also be a spring.

When the actuating element 66 of the carriage 3 causes the microswitch MS-3' to close, the reversible drive motor RM is reversed and at the same time the plunger MG2 is energized so that the gear 71 meshes with the gear 72 while the mechanisms for preventing the rotation in the counterclockwise direction of the rollers 59 and 60 are released thereby rotating the rollers 59 and 60 in the clockwise direction so as to transport the photosensitive member P. In this case, by the plunger MG3 the rack plate 65 may be retracted from the path of the pinion 64.

When the carriage 3 starts to move in the direction indicated by $b$, the rollers 59 and 60 are caused to rotate through a chain 58, the gear train consisting of the gears 73, 74, 75, 71 and 72, and the belt 70 so that the photosensitive member P is transported backwardly of the carriage 3. In this case, the carriage 3 moves at the same velocity as the feed velocity of the rollers 59 and 60 while the photosensitive member P is held in the exposure plane by the rollers 59 and 60.

While the carriage 3 moves in the direction indicated by the arrow $b$, the light image incident slit of the optical system scans the original 13 placed upon the machine frame 1. Since the carriage 3 moves in the direction indicated by the arrow $b$ at the velocity $V$, the photosensitive member $P_1'$ in the exposure plane seems stationary relative to the original which is held stationary. As the exposure unit 7 is displaced, the light image of the original 13 is displaced in the direction indicated by the arrow $b$. When the carriage 3 reaches the end of the exposure stroke, that is the position indicated by the solid line in FIG. 17, the microswitch MS-1' is opened by the actuating member 76 so that the drive motor mounted upon the machine frame 1 is stopped, thus accomplishing the photocopying operation.

The photosensitive member P fallen upon a receiving plate 61 from the rear end of the carriage 3 in the above described exposure stroke or step may be pressed against the receiving plate 61 by the pressure roller 77 in correct position. The pressure roller 77 is carried by the arms 78 which in turn are pivotably fixed to the carriage 3 so that the roller 77 may roll upon the receiving plate 61 when the carriage 3 is reciprocated and may be placed in the raised position as indicated by the chain line in FIG. 17 at the end of the going stroke of the carriage 3.

For bringing the pressure roller 77 to its raised position, a cam plate 79 is disposed at the end of the going stroke of the carriage 3 so that the pressure roller 77 may be raised by this cam plate 79 or a plunger may be actuated so as to raise the arms 78, thereby lifting the roller 77.

When the carriage 3 returns to its initial position, the trailing edge of the photosensitive member P is released from the rollers 60 and the photosensitive member is placed upon the receiving plate 61. Since the pressure roller 77 is normally rotated as described above, the pressure roller 77 rides over a rubber roller 62 so that the exposed photosensitive member P may be advanced toward a pair of feed rollers 21 which normally rotate. Thereafter, the exposed photosensitive member may be directed toward the developing unit 20 by the pair of feed rollers 21 and the developed photosensitive member may be discharged out of the machine through a pair of squeezing rollers 22 and the drier 23.

For means of transporting a photosensitive member from the rolled photosensitive member P in response to the reciprocal motion of the carriage as described hereinabove and depending upon the size of the original 13, an indexing plate 80 having an index $80_1$ is provided. The indexing plate 80 may be moved in parallel with the direction of the movement of the carriage 3 so that the index $80_1$ may be aligned with one side edge $13_1$ of the original. To the indexing plate 80 are attached the microswitch MS-2' for actuating the cutters $51_1$ and $51_2$ and the microswitch MS-3' for reversing the carriage 3.

The mode of operation is as follows. First, one side edge of the original 13 is aligned with the reference line, such as the leading edge of the original holder 50 while the index $80_1$ is aligned with the trailing edge $13_1$ of the original 13. Then, the stroke or distance of the reciprocal movement of the carriage 3 is controlled depending upon the size of the original. That is, the length of the photosensitive member to be fed or transported is determined. When the carriage 3 reaches the microswitch MS-2', the feed of the photosensitive member as described hereinabove is stopped and cut off from the roll by the cutters $51_1$ and $51_2$.

When the photosensitive members cut to predetermined sizes are used, a stack of sheets corresponding to the size of an original to be copied may be placed in the photocopying machine.

FIG. 22 shows an electrical circuit for the photocopying machine shown in FIG. 17. Upon closing the main switch S, a pilot lamp PL is turned on; fan motors F1 and F2 and the motor M1 for the developing unit are rotated. Upon depression of the pushbutton PS, the relay $RL'_3$ is operated so that the contacts K3-1-1, K3-2-1 and K3-3 are closed so as to drive the reversible motor RM whereby the carriage 3 may be moved in the direction indicated by the arrow $a$. At the same time, the circuit of the high voltage source HV for the corona discharger 8 is closed. The rollers 52 and 53 are caused to rotate by the motor RM so that the photosensitive member P is transported. When the carriage 3 reaches the predetermined position, the microswitch MS-2' is closed so that the relay $RL'_1$ is operated. The relay $RL'_1$ is self-locked by the contact K1-1 and energizes the plunger MG1 by closing the contact K1-2 so that the transportation of the photosensitive member may be stopped. Simultaneously, the cutters $51_1$ and $51_2$ are actuated thereby cutting off the photosensitive member into a predetermined size. When the microswitch MS-3' is opened by the further movement of the carriage 3, the relay $RL'_3$ is deenergized so that the contacts K3-1-2 and K3-2-2 are closed while the contact K3-3-3 is opened. Then the relay $RL'_2$ is energized so that the contacts K2-1, K2-2 and K2-3 are closed thereby reversing the rotation of the reversible motor RM. At the same time, the illumination lamps $4_1, \ldots 4_n$ are turned on and the plungers MG2 .... MG3 are energized.

Upon reversal of the rotation of the reversible motor RM, the carriage 3 is reversed. That is, the carriage 3 is moved in the direction indicated by the arrow $b$ in FIG. 17, and the carriage 3 makes the exposure stroke so that the photosensitive member which is held in correct position by the rollers 59 and 60 is exposed through the slit by the light from the original 13.

When the carriage 3 returns to its initial position, the microswitch MS-1' is opened so that the relays $RL'_1$ and $RL'_2$ are deenergized, thereby opening the contacts K1-1, K1-2, K2-1, K2-2 and K2-3. Thus, the illumination lamps $4_1 \ldots 4_n$ are turned off and the reversible motor RM is stopped. The exposed photosensitive member P' is discharged out of the machine after passing through the developing unit 20 and the drier 23 by the rollers 62, 21, 22 and 31, thus accomplishing the copying operation.

The above described copying operation may be repeated continuously whenever the pushbutton PS is depressed. When the main switch S is opened, operation of the copying machine is stopped.

According to the present invention in which an original is held in stationary position and a carriage having an original projection system, an original illumination system and an exposure unit arranged in unitary construction, is reciprocated in such a manner that in one stroke of the carriage a photosensitive member is automatically fed therein and in the return stroke of the carriage the photosensitive member is exposed through the slit of the exposure unit, the relative position of the projection system to the exposure unit may be maintained stationary without any deviation so that the image of the original may be correctly and sharply focused, thereby carrying out the automatic and continuous copying with better quality images.

Furthermore, the carriage and the photosensitive member may be moved in the opposite directions with respect to each other so that the overall length of the copying machine may be reduced. Thus, the photocopying machine according to the present invention is made simple in construction and compact in size and is capable of carrying out high-speed copying.

The exposed photosensitive member falls upon a receiving plate from the carriage in the exposure stroke or step and may be continuously pressed against the receiving plate by a pressure roller drivingly connected to the carriage so that the photosensitive member may be held in correct position upon the receiving plate, thereby facilitating the smooth transportation of the exposed photosensitive member to the developing section.

What is claimed is:
1. An electrophotographic copying machine comprising
   a housing,
   an original holder disposed at the upper portion of said housing,
   a carriage disposed within said housing,
   a slit exposure means carried by said carriage,
   means disposed upon said carriage for transmitting an image of an original to said exposure means,
   means for reciprocating said carriage relative to said original, and
   means for transporting a photosensitive member through said slit exposure means.
2. An electrophotographic copying machine according to claim 1 wherein said means disposed upon said carriage for transmitting an image of an original to said exposure means comprises an illumination lamp, a reflecting mirror and a lens.
3. An electrophotographic copying machine comprising
   a housing,
   an original holder disposed at the upper portion of said housing,
   a carriage disposed within said housing,
   a slit exposure means carried by said carriage,
   means disposed upon said carriage for transmitting an image of an original to said exposure means,
   a discharging means disposed upon said carriage for imparting electrostatic charge to a photosensitive member,
   means for reciprocating said carriage relative to said original, and
   means for transporting said photosensitive member through said discharging means and said slit exposure means.
4. An electrophotographic copying machine according to claim 3 wherein said slit exposure means and said discharging means disposed upon said carriage are arranged substantially in parallel with the surface of said original holder.

5. An electrophotographic copying machine according to claim 3 wherein said slit exposure means and said discharging means upon said carriage are arranged substantially vertically of the surface of said original holder.

6. An electrophotographic copying machine comprising
a housing,
an original holder disposed at the upper portion of said housing,
a carriage disposed within said housing,
a slit exposure means carried by said carriage,
means disposed upon said carriage for transmitting an image of an original to said slit exposure means,
means for reciprocating said carriage relative to an original placed upon said original holder,
developing means, and
means for transporting a photosensitive member through said slit exposure means to said developing means.

7. An electrophotographic copying machine comprising
a housing
an original holder disposed at the upper portion of said housing,
a carriage disposed within said housing,
a slit exposure means carried by said carriage,
a discharging means for imparting electrostatic charge to a photosensitive member,
means for transmitting an image of an original to said exposure means,
means for reciprocating said carriage relative to said original, and
means for transporting said photosensitive member through said slit exposure means during one unidirectional stroke of said carriage.

8. An electrophotographic copying machine according to claim 7 wherein said means for transporting the photosensitive member comprises
a pair of guide rollers, and
a belt,
one of said guide rollers having a spring incorporated therein for winding said belt, one end of said belt being fixed to said spring incorporating guide roller, the other end being fixed to said housing so that said belt may be extended horizontally, thereby transporting a photosensitive member placed upon said belt to said slit exposure means while said belt is wound around said spring incorporating guide roller.

9. An electrophotographic copying machine comprising
a housing,
an original holder disposed at the upper portion of said housing,
a carriage disposed within said housing,
a slit exposure means carried by said carriage,
a discharging means for imparting electrostatic charge to a photosensitive member,
means for transmitting an image of an original placed upon said original holder to said slit exposure means,
means for reciprocating said carriage relative to said original, developing means, and
means for transporting said photosensitive member through said discharging means and said developing means.

10. An electrophotographic copying machine comprising
a housing,
an original holder disposed at the upper portion of said housing,
a carriage disposed for reciprocating movement within said housing,
a slit exposure means carried by said carriage,
means for transmitting an image of an original placed upon said original holder to said slit exposure means,
means for reciprocating said carriage relative to said original, and
means for transporting a copying member to said slit exposure means synchronously with carriage movement during one unidirectional stroke of said carriage.

11. An electrophotographic copying machine comprising
a housing,
an original holder disposed at the upper portion of said housing,
a carriage disposed within said housing,
a slit exposure means carried by said carriage,
means disposed upon said carriage for transmitting an image of an original to said slit exposure means,
means for reciprocating said carriage relative to the original,
means for transporting the photosensitive member during one unidirectional stroke of said carriage,
means for exposing said photosensitive member through said slit exposure means during the reverse unidirectional stroke of said carriage, developing means, and
means for transporting the exposed photosensitive member to said developing means.

12. An electrophotographic copying machine comprising
a housing,
an original holder disposed at the upper portion of said housing,
a carriage disposed within said housing,
a slit exposure means carried by said carriage,
means disposed upon said carriage for transmitting an image of an original to said slit exposure means,
means for reciprocating said carriage relative to the original,
means for transporting the photosensitive member during one unidirectional stroke of said carriage through a distance according with the size of an original, and
means for exposing said photosensitive member through said slit exposure means during the reverse unidirectional stroke of said carriage.

13. An electrophotographic copying machine comprising
a housing,
an original holder disposed at the upper portion of said housing,
a carriage disposed within said housing,
a slit exposure means carried by said carriage,
means disposed upon said carriage for transmitting an image of an original to said slit exposure means,
means for reciprocating said carriage relative to the original,
means for transporting the photosensitive member during one unidirectional stroke of said carriage and for cutting it to a length according with the size of the original, and
means for exposing said photosensitive member through said slit exposure means during the reverse unidirectional stroke of said carriage.

* * * * *

UNITED STATES PATENT OFFICE
CERTIFICATE OF CORRECTION

Patent No. 3,637,303                    Dated January 25, 1972

Inventor(s) Shigehiro Komori et al.

It is certified that error appears in the above-identified patent and that said Letters Patent are hereby corrected as shown below:

Column 1, line 11, after "copying" insert --operation--.

Column 1, line 61, delete "the" (first instance).

Column 2, line 34, after "20" insert --is--.

Column 2, line 74, delete "is uniformly imparted with the" and insert --receives uniform--.

Column 4, line 9, after "contact" insert --$K_1$-1--.

Column 4, line 43, after "$40_1$" insert --and $40_2$--.

Column 4, line 66, delete "1" (third instance).

Column 5, line 6, delete "reversed" and insert --opened--.

Column 5, line 11, before "2" insert --K1-2---.

Column 5, line 25, delete "a".

Column 6, line 29, delete "be" and insert --by--.

Column 8, line 28, before "opposite" delete "the".

Signed and sealed this 7th day of November 1972.

(SEAL)
Attest:

EDWARD M. FLETCHER, JR.
Attesting Officer

ROBERT GOTTSCHALK
Commissioner of Patents